(12) United States Patent
Sundaresan

(10) Patent No.: US 7,099,833 B1
(45) Date of Patent: Aug. 29, 2006

(54) DYNAMIC PRICING SYSTEM AND METHOD FOR ELECTRONIC STORES

(75) Inventor: Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 09/676,529

(22) Filed: Oct. 2, 2000

(51) Int. Cl.
G06Q 30/00 (2006.01)

(52) U.S. Cl. .............................. 705/26; 705/20; 705/37

(58) Field of Classification Search .................. 705/25, 705/26, 1, 400, 20, 37, 14, 27; 709/207, 709/219; 715/500
See application file for complete search history.

(56) References Cited

U.S. PATENT DOCUMENTS

| | | | |
|---|---|---|---|
| 4,992,940 A * | 2/1991 | Dworkin ........................ | 705/26 |
| 5,873,069 A * | 2/1999 | Reuhl et al. .................... | 705/20 |
| 6,012,090 A * | 1/2000 | Chung et al. ................... | 709/219 |
| 6,055,564 A * | 4/2000 | Phaal ............................ | 709/207 |
| 6,076,070 A * | 6/2000 | Stack ............................ | 705/26 |
| 6,304,854 B1 * | 10/2001 | Harris ........................... | 705/27 |
| 6,976,006 B1 * | 12/2005 | Verma et al. ................... | 705/27 |
| 2002/0016779 A1 * | 2/2002 | Roll et al. ..................... | 705/400 |
| 2002/0099562 A1 * | 7/2002 | Bruce et al. .................... | 705/1 |
| 2002/0147674 A1 * | 10/2002 | Gillman ......................... | 705/37 |
| 2003/0167209 A1 * | 9/2003 | Hsieh ............................ | 705/26 |
| 2004/0015415 A1 * | 1/2004 | Cofino et al. ................... | 705/26 |
| 2005/0010857 A1 * | 1/2005 | Shmukler et al. ............. | 715/500 |
| 2005/0240492 A1 * | 10/2005 | Grdina .......................... | 705/26 |

FOREIGN PATENT DOCUMENTS

WO  WO 00/43850  * 1/2000

OTHER PUBLICATIONS

"Bot Till You Drop, Every e-commerce website needs a bargain-hunting shopping agent. Just ask Amazon.com," Time Magazine, Chris Taylor, Oct. 11, 1999, vol. 154 No. 15.*
Ralph Hauser and Gene Tsudik, "On Shopping Incognito".

* cited by examiner

*Primary Examiner*—Yogesh C. Garg
(74) *Attorney, Agent, or Firm*—Edmund H. Mizumoto, Esq.; McGinn IP Law Group, PLLC

(57) ABSTRACT

A system and method for conducting electronic commerce, includes electronically visiting, by a customer interested in shopping for an item, a comparison shopping site ("CompShop"), and inquiring about the item and comparative prices thereof, running, by the "CompShop", a query on all a plurality of electronic stores it is aware of asking for a price of the item, and selectively determining, by at least one of the electronic stores, an offer price of the item and selectively returning one of a static price and a modified price. The modified price results from the at least one of the electronic stores learning the best (e.g., lowest or highest depending upon the embodiment) offer price received by the CompShop from all of the electronic stores.

24 Claims, 3 Drawing Sheets

DYNAMIC PRICING SYSTEM AND METHOD FOR ELECTRONIC STORES

BACKGROUND OF THE INVENTION

1. Field of the Invention

The present invention relates to a system and method for electronic commerce, and more particularly to a system and method by which an electronic store (e.g., an "eStore" provided on a world-wide network such as the Internet) can offer a competitive price to a customer when there is another eStore that offers a competitive price, and the prospective customer is somehow aware of the existence of such a competition.

2. Description of the Related Art

Shopping over the Internet is increasingly becoming important and a prime way of doing business and conducting transactions. As the amount of Internet shopping explodes, electronic businesses (e.g., so-called "eBusinesses") and eStores must address similar kinds of pricing issues that conventional stores face. One pricing issue is that of competitive pricing. A number of comparison shopping business sites have been developed (e.g., e-compare.com) which allows comparison shopping over the Internet.

A typical scenario is described below. A user looking for a book "Of Mice and Men" (or the like) visits the comparison shopping site and inquires about the book. The comparison shopping site keeps track of all eStores that sell this book. It runs a query asking for the price and shipping and handling cost of this book on each of these sites and lists the prices to the user in the form of a table. The table contains entries, such as shop name, base price, shipping charges, availability, etc. The user can immediately compare the prices and the other attribute(s) and pick one of the stores at which to shop. Such comparison sites also typically provide a "click-through" facility whereby the user can directly click on the Universal Resource Locator (URL) of the eStore that qualifies the user criteria and the user can shop at that store. In this manner, the comparison shopping business makes a commission for the referral to the eStore from the eStore from which the user buys the product.

This is a "win—win" situation for the customer since the customer gets the best price without actually visiting many eStores manually. The comparison shopper "wins" due to referral commissions, and the eStore in which the user buys the product or service "wins" because it obtains the business it may not otherwise have obtained.

However, a drawback with the above system is that other stores do not have a chance of winning even though they might be willing to bring the price down if they knew that there was a competitive offer. This is a problem.

SUMMARY OF THE INVENTION

In view of the foregoing and other problems, disadvantages, and drawbacks of the conventional methods and structures, an object of the present invention is to provide a method and structure in which electronic commerce is performed such that stores have a chance of winning a bid/transaction since they have the opportunity to know about the outstanding competitive bids, and that such stores may be willing to bring the price down for an item or service in order to make the sale.

In a first aspect of the present invention, a method (and system) for conducting electronic commerce, includes electronically visiting, by a customer interested in shopping for an item (e.g., a product or service), a comparison shopping site ("CompShop"), and inquiring about the item and comparative prices thereof, running, by the "CompShop", a query on all of a plurality of electronic stores it is aware of which handle the item asking for a price of the item, and selectively determining, by at least one of the electronic stores, an offer price of the item, and selectively returning one of a static price and a modified price, the modified price resulting from the at least one of the electronic stores learning the best (e.g., lowest or highest offer price depending upon the embodiment) price received by the CompShop from all of the electronic stores.

With the invention, for the eStore to know that there is a competitive store and that the prospective customer is aware of this competition, the eStore somehow must know that the customer is using a comparison shopping site to inquire about the prices of the products or services. Then, the eStore can appropriately price the commodity if the request is made through a comparison shopping site. Otherwise, it can return its standard price.

The above operation can be compared to the traditional model of "coupon clipping" or "mail in rebates". Stores typically give a special price to customers who bring in coupons. However, the stores rely on the fact that there will be many customers who do not clip coupons or who will forget to turn in the mail-in rebates.

Similarly, eStores can rely on the fact that not all customers are going to visit them through comparison shopping sites and can afford to give a competitive price to those who do visit them through such sites.

Thus, with the invention, consumers should receive lower prices, and electronic stores should make sales which they otherwise would not have made. At the same time, the system allows the eStores to dynamically adjust prices based upon demand, inventory, and other market conditions.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
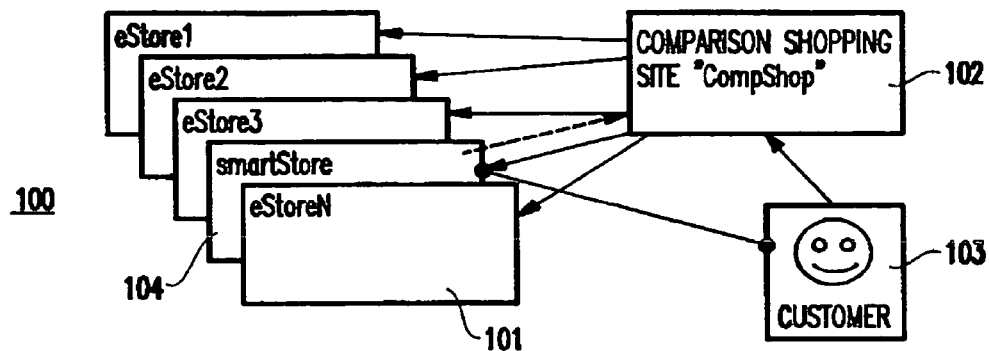
FIG. 1 illustrates an exemplary architecture of the invention.

Referring now to the drawings, and more particularly to FIGS. 1–5, there are shown preferred embodiments of the method and structures according to the present invention.

Turning to FIG. 1, an exemplary environment 100 of the architecture of the present invention is shown. In FIG. 1, there are a plurality of electronic stores ("eStores") 101, a comparison shopping site (e.g., hereafter "CompShop") 102, and the customer 103. At least one of the eStores includes the inventive structure, thereby making it a "smartStore"

104. Each of the above components 101–104 is linked together electronically via a network such as the Internet or an Intranet.

In FIG. 1, the solid arrows indicate the "visitor" at the tail and the "visitee" at the head. The dotted arrow indicates the smartStore 104 (e.g., the structure of the present invention) =visiting the "CompShop" to snoop on (learn) the price. The bullet-headed dotted line indicates the eventual binding of the customer to the smartStore 104

Figure 2:
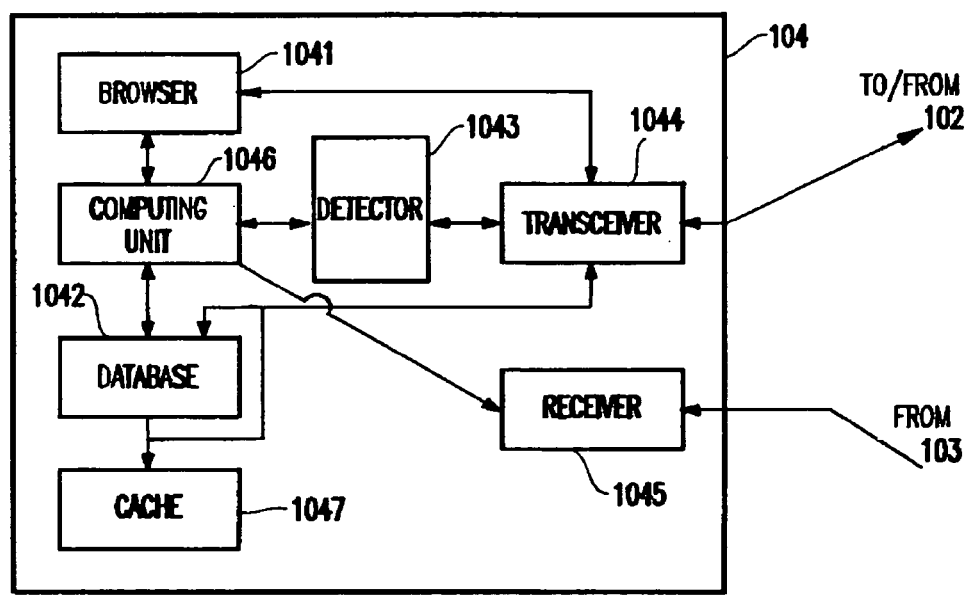
FIG. 2 illustrates components of the Smart Store according to the present invention.

FIG. 2 illustrates the components of the smartStore 104 according to the present invention. In an exemplary embodiment, the smartStore 104 includes a browser 1041 of the client, a database 1042 for storing prices, etc. of its products, a detector 1043 for detecting whether the query is being made from a CompShop or not, a transceiver 1044 for transmitting prices etc. to the CompShop and for receiving queries therefrom, a receiver 1045 for receiving requests from the customer for ordering the product, and a computing (processing) unit/program 1046.

Further, the smartStore may include a caching facility for caching recent prices. Along these lines, a cache 1047 may be provided in the CompShop for similarly caching recently provided prices from electronic stores.

Figure 3:
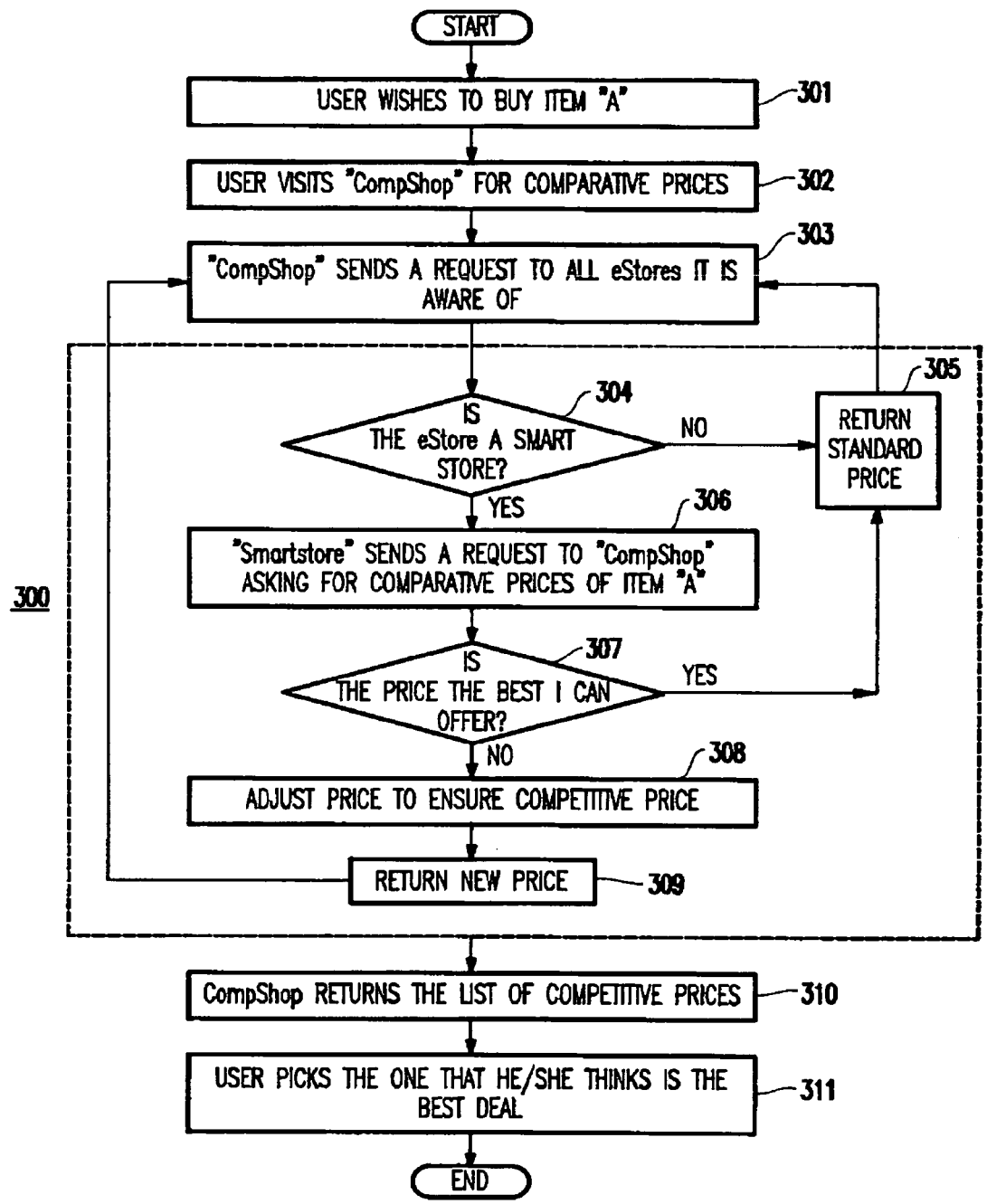
FIG. 3 illustrates a flowchart of the method 300 of performing electronic commerce according to the present invention.
Figure 5:
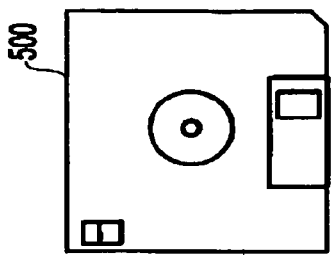
FIG. 5 illustrates a signal bearing medium 500 (e.g., storage medium) for storing steps of a program of the method 300 according to the present invention.

Turning to FIG. 3, a flowchart is shown of the method 300 according to the present invention.

In operation, the invention works as follows.

That is, in steps 301 and 302, the customer is interested in shopping for an item A, and visits a comparison shopping site "CompShop", and inquires about the item and comparative prices thereof.

In step 303, the "CompShop" runs a query on all the eStores it is aware of who carry the product, service, etc. of interest (hereafter assumed to be an "item A"), and asks for the price of the item. Steps 304–309 represent new steps added to the conventional method.

In running the query, what is returned to the comparison shopping site will depend upon whether the electronic store is a smartStore or a conventional electronic store. Thus, in step 304, it is determined by the system whether the eStore is a smartStore.

In step 304, if the eStore is determined not to be a smartStore, then in step 305 a standard price is returned and the process loops back to step 303 for the system to wait for another request.

If the eStore is determined to be a smartStore (e.g., a "YES") in step 304, then in step 306, the eStore that implements the invention (e.g., "smartStore" 104), sends a request to the "CompShop" asking for comparative prices of item "A", and in step 307 determines whether the asking price is the best price that can be offered. If it is determined to be the best price, then the smartStore loops to step 305 and returns its standard price.

If "NO" in step 307, then in step 308, the smartStore adjusts the price to issue a competitive price, and in step 309 returns a new price to the "CompShop". Thus, the smartStore does not return a static price, but instead automatically changes the price depending on who is asking for the price and what the best price (thus far) is as recorded and provided by the CompShop.

The smartStore keeps a list of comparison shopping sites. Thus, if a request is not from a comparison shopping site, then the smartStore returns its standard price in step 305. If the request for price is from a comparison shopping site like a "CompShop", it actually turns around and submits a request to the "CompShop" or another comparison shopping site to get a list of all comparison prices for the item.

When the smartStore obtains a comparative list of pricing, it goes through the list and determines if it is offering a competitive (the lowest) price. If not, the smartStore checks to see if it can afford to offer a lower price based upon the comparison and its own cost price and required profit margin.

If the smartStore can offer a lower price to attract the customer, it will return that price to the "CompShop"request. Otherwise, it will return its standard price to the "CompShop". As such, a "Dutch auction" (e.g., reverse auction) is engendered by the invention in which the customer obtains the lowest price possible.

Then, in step 310, the "CompShop" returns the list of prices to the user. The user, based upon the prices received, picks their choice of eStore possibly choosing "SmartStore" because it used the present invention to offer a competitive price on the item.

Thus, with the unique and unobvious features of the present invention, a win—win—win situation is created for the customer, the comparison shop and the eStore. That is, the customer gets the best price without actually visiting many eStores manually, the comparison shop "wins" due to referral commissions, and the eStore (in which the user buys) "wins" because it obtains the business it may not otherwise have obtained.

Further, other stores have a chance of winning since they have the opportunity to know about the outstanding competitive bids and may be willing to bring the price down (or up depending upon the environment and scenario).

Figure 4:
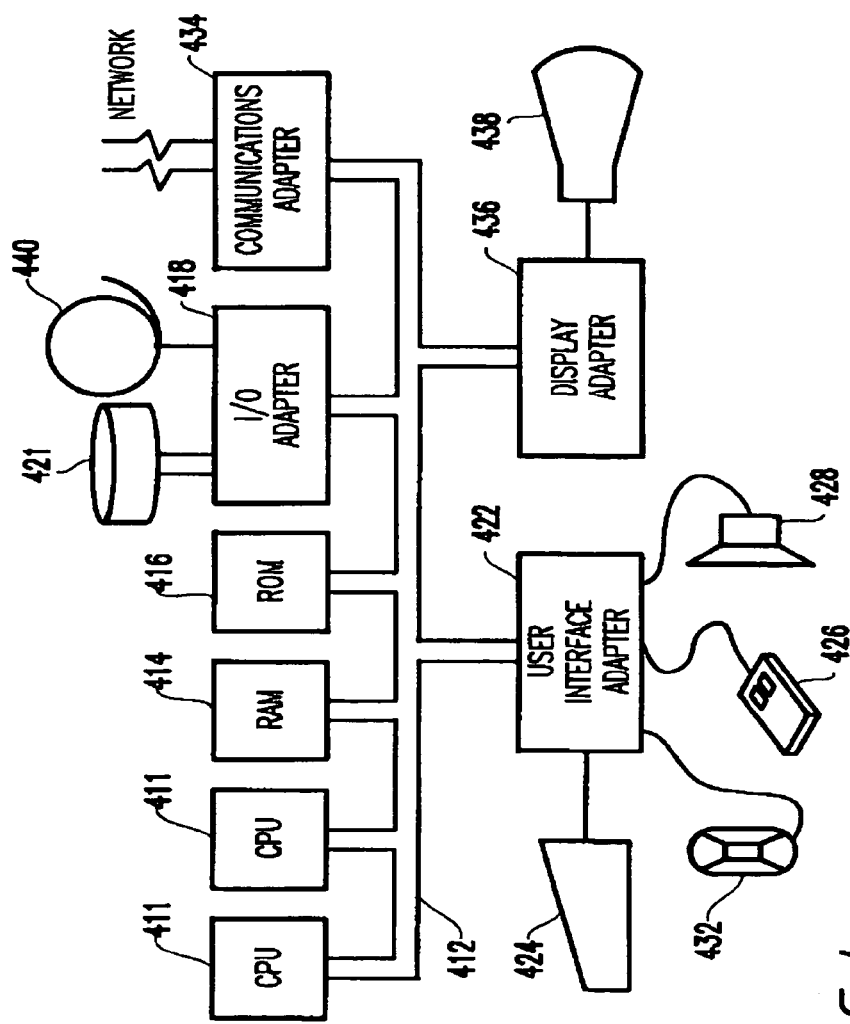
FIG. 4 illustrates an exemplary hardware/information handling system 400 for incorporating the present invention therein.

FIG. 4 illustrates a typical hardware configuration of an information handling/computer system in accordance with the invention and which preferably has at least one processor or central processing unit (CPU) 411.

The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, an Intranet, a personal area network (PAN), etc., and a display adapter 436 for connecting the bus 412 to a display device 438 and/or printer 439.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 411 and hardware above, to perform the method of the invention.

This signal-bearing media may include, for example, a RAM contained within the CPU 411, as represented by the fast-access storage for example. Alternatively, the instructions may be contained in another signal-bearing media, such as a magnetic data storage diskette 500 (FIG. 5), directly or indirectly accessible by the CPU 411.

Whether contained in the diskette 500, the computer/CPU 411, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While a preferred embodiment of the present invention has been described above, it should be understood that it has been provided as an example only. Thus, those skilled in the art will recognize that the invention can be practiced with modification within the spirit and scope of the appended claims.

For example, while it is noted that the example above is directed to providing the lowest price to the consumer, in some situations a higher price may be desirable to be offered by the smartStores.

In another embodiment of the invention, the SmartStore may not necessarily visit the comparison shopping engine on every request, but instead may cache the information and only infrequently visit the comparison shopping engine.

In yet another embodiment of the invention, the system may allow the price comparison to be performed on not necessarily exactly the same type of item, but on a similar item or even offer a graded price based on a search. For instance, if the hard cover of a particular book is available elsewhere for $20, the system may adjust the price of the soft cover of the same book from $18 to $15.

The invention claimed is:

1. A method for conducting electronic commerce, comprising:
    electronically visiting, by a customer interested in shopping for an item, a preselected comparison shopping site, and inquiring about the item and comparative prices thereof;
    running, by the preselected comparison shopping site, a query on a plurality of electronic stores carrying the item, and asking for a price of the item, the plurality of electronic stores including at least one smartStore;
    determining by the at least one smartStore that the query is received from the preselected comparison shopping site; and
    selectively determining, by the smartStore, an offer price of the item and selectively returning one of a static price and a modified price,
    wherein the modified price and selectively returning, by the smartStore, of said one of the static price and the modified price result from:
    (i) the smartStore sending a request to the preselected comparison shopping site asking for comparison prices of the items from the plurality of electronic stores other than the smartStore; and
    (ii) the smartStore learning a best offer price received by the preselected comparison shopping site from the plurality of electronic stores other than the smartStore.

2. The method of claim 1, further comprising:
    returning a standard price by at least one of the plurality of electronic stores determined not to be the smartStore.

3. The method of claim 1, further comprising:
    sending, by the smartstore, a request to the preselected comparison shopping site asking for comparative prices of the item; and
    determining, by the smartStore, whether an asking offer price is the best offer price that can be offered, wherein if the asking offer price is determined to be a lowest price, ten the smartStore returns its static price.

4. The method of claim 1, further comprising:
    if the asking offer price is determined not to be a lowest price, then adjusting, by the smartStore, the price; and
    returning a new price to the preselected comparison shopping site.

5. The method of claim 4, wherein the at least one of the electronic stores automatically changes the price depending on the customer for the item asking for the price and what the lowest price is as recorded by the preselected comparison shopping site.

6. The method of claim 1, further comprising:
    maintaining, by the smartStore, a list of preselected comparison shopping sites.

7. The method of claim 6, further comprising:
    if a request is made from other than the list of preselected comparison shopping sites, then returning by the smartStore, the static price; and
    if the request for the price is from the list of preselected comparisons shopping sites, then submitting by the smartStore a request to the preselected comparison shopping site to get a list of all comparison prices for the item.

8. The method of claim 7, further comprising;
    when the smartStore obtains the list of all comparison prices, determining whether the smartStore can offer a lowest price.

9. The method of claim 8, wherein the smartStore determines whether it can afford to offer the lowest price based upon the list of all comparison prices and its own cost price and required profit margin.

10. The method of claim 9, further comprising:
    if the smartStore can offer the lowest price, then returning the lowest price to the preselected comparison shopping site.

11. The method of claim 9, further comprising:
    if the smartStore cannot offer the lowest price, then returning its static price to the preselected comparison shopping site.

12. The method of claim 1, further comprising:
    returning, by the preselected comparison shopping site, a list of prices to the customer.

13. The method of claim 1, further comprising:
    selecting, by the customer, based upon prices received, a choice of one of the plurality of electronic stores for providing the item.

14. The method according to claim 1, wherein the item comprises a product.

15. The method according to claim 1, wherein the item comprises a service.

16. The method according to claim 1, wherein the best offer price is a lowest offer price.

17. The method according to claim 1, wherein the best offer price is a highest offer price.

18. The method according to claim 1, further comprising:
    caching, by the preselected comparison shopping site, prices received from the plurality of electronic stores.

19. The method according to claim 1, further comprising:
    caching, by the smartStore, a list of prices received from the preselected comparison shopping site.

20. The method of claim 1, wherein the smartStore selectively visits the preselected comparison shopping site, such that information from the preselected comparison shopping site is cached by the smartStore for a comparison with a price request occurring between visits to the preselected comparison shopping site.

21. The method of claim 1, wherein a price comparison is performed on an identical item and a substantially identical item, and wherein a graded price is offered on the substantially identical item.

22. A system for conducting electronic commerce between a customer and one of a plurality of electronic stores, comprising:

a plurality of electronic stores;

a preselected comparison shopping site coupled to the plurality of electronic stores and a customer interested in purchasing an item, wherein at least one of the plurality of electronic stores comprises a smartStore that recognizes that a source of a query is from the preselected comparison shopping site and not from a non-comparison shopping site; and an electronic medium for linking the customer, each of the plurality of electronic stores, and the preselected comparison shopping site together electronically, wherein the preselected comparison shopping site runs the query on the plurality of electronic stores and requests an offer price of the item, wherein the smartStore determines a predetermined offer price of the item from the plurality of electronic stores and selectively returns one of a static price and a modified price, said one of the static price and the modified price result selectively returned being based on:

(i) the smartStore recognizing that the query is from the preselected comparison shopping site;

(ii) the smartStore sending a request to the preselected comparison shopping site asking for comparison prices of the items from the plurality of electronic stores other than the smartStore; and (iii) the smartStore learning a lowest offer price received by the preselected comparison shopping site from all of the plurality of electronic stores other than the smartStore.

23. A system for performing electronic commerce, comprising:

a preselected comparison shopping site, means for electronically visiting, by a customer interested in shopping for an item, the preselected comparison shopping site, and inquiring about the item and comparative prices thereof;

means for running, by the preselected comparison shopping site, a query on a plurality of electronic stores, asking for a price of the item; and means for determining, by at least one of the plurality of electronic stores that recognizes the query from the preselected comparison shopping site and not from a non-comparison shopping site, an offer price of the item and returning one of a static price and a modified price, the modified price resulting from:

(i) the at least one of the plurality of electronic stores that recognizes the query from the preselected comparison shopping site sending a request to the comparison shopping site asking for comparison prices of the items from the plurality of electronic stores other than the at least one of the plurality of electronic stores that recognizes the query; and (ii) the at least one of the plurality of electronic stores that recognizes the query from the preselected comparison shopping site learning a lowest offer price received by the preselected comparison shopping site from the plurality of electronic stores other than the at least one of the plurality of electronic stores that recognizes the query, wherein the means for determining and returning returns said one of the static price and the modified price based on the learned lowest offer price received by the preselected comparison shopping site from the plurality of electronic stores other than the at least one of the plurality of electronic stores that recognizes the query.

24. A signal-bearing medium tangibly embodying a program of machine-readable instructions executable by a digital processing apparatus to perform a method of conducting electronic commerce, the method comprising:

electronically visiting, by a customer interested in shopping for an item, a preselected comparison shopping site, and inquiring about the item and comparative prices thereof;

running, by the preselected comparison shopping site, a query on a plurality of electronic stores asking for a price of the item; and determining, by at least one of the plurality of electronic stores that recognizes the query from the preselected comparison shopping site and not from a non-comparison shopping site, an offer price of the item and returning one of a static price and a modified price, the modified price resulting from:

(i) the at least one of the plurality of electronic stores that recognizes the query from the preselected comparison shopping site sending a request to the comparison shopping site asking for comparison prices of the items from the plurality of electronic stores other than the at least one of the plurality of electronic stores that recognizes the query; and (ii) the at least one of the plurality of electronic stores that recognizes the query from the preselected comparison shopping site learning a lowest offer price received by the preselected comparison shopping site from the plurality of electronic stores other than the at least one of the plurality of electronic stores that recognizes the query, wherein said returning said one of the static price and the modified price is based on the learned lowest offer price received by the preselected comparison shopping site from the plurality of electronic other than the at least one of the plurality of electronic stores that recognizes the query.

* * * * *